United States Patent [19]

Endo et al.

[11] Patent Number: 4,486,100
[45] Date of Patent: Dec. 4, 1984

[54] APPARATUS FOR FEEDING SYNTHETIC RESIN POWDER TO SCREW EXTRUDER

[75] Inventors: Kaichi Endo; Yoshihiro Katahira; Eiichi Hayashi; Satoshi Nakano, all of Fukushima, Japan

[73] Assignee: Kureha Kogyo Kabushiki Kaisha, Japan

[21] Appl. No.: 497,913

[22] Filed: May 25, 1983

[30] Foreign Application Priority Data

May 27, 1982 [JP] Japan .................................. 57-90231

[51] Int. Cl.³ ................................................. B29B 5/00
[52] U.S. Cl. ..................................... 366/76; 366/139; 406/23; 406/33; 425/145; 222/71
[58] Field of Search ................... 366/76, 139, 79, 163; 406/23, 33; 141/192, 198; 222/71, 72, 73; 425/145, 146

[56] References Cited

U.S. PATENT DOCUMENTS

| | | | |
|---|---|---|---|
| 3,258,296 | 6/1966 | Funk | 406/23 |
| 3,694,037 | 9/1972 | Feder | 406/23 |
| 3,989,308 | 11/1976 | Zimmermann | 406/23 |
| 4,249,877 | 2/1981 | Machen | 366/76 |
| 4,379,663 | 4/1983 | Allison | 406/23 |

Primary Examiner—Robert W. Jenkins
Attorney, Agent, or Firm—Sughrue, Mion, Zinn, Macpeak, and Seas

[57] ABSTRACT

An apparatus for the feeding of powderous resin material to a vacuum hopper is improved by providing at least one vertical pipe-line portion between the resin tank and the vacuum hopper, and disposing a flow restricting element such as an orifice in this pipe-line portion.

6 Claims, 2 Drawing Figures

APPARATUS FOR FEEDING SYNTHETIC RESIN POWDER TO SCREW EXTRUDER

BACKGROUND OF THE INVENTION

The present invention relates to an apparatus for feeding synthetic resin powder to a screw extruder, and, particularly, to an apparatus for feeding synthetic resin powder to a screw extruder, in which a vertical pipeline having an orifice is provided between a vacuum hopper directly connected to the screw extruder and a raw synthetic resin powder tank, so that the raw synthetic resin powder may be continuously for intermittently fed into the vacuum hopper while the degree of vacuum in the hopper is maintained substantially constant.

In producing various kinds of products by using a screw extruder, a method has been generally used in which a raw material polymer is fed to the screw extruder after being made into the form of a pellet. Another method is also employed, however, in which, when the raw material polymer is in the form of powder, it is directly fed to the screw extruder as it is. The latter method is preferably employed in the case where the raw material is a synthetic resin powder which does not respond well to an increase in its thermal history.

There is a disadvantage in the latter method, in that if air enters the screw extruder together with the synthetic resin powder, not only may the quality of the product be deteriorated, but the raw material synthetic resin may be easily decomposed, so that the decomposed material adheres to the inside of the screw extruder. This necessitates frequent cleaning of the insides of the screw extruder, resulting in lowered production efficiency.

Thus, it is considered that when synthetic resin powder is applied to a screw extruder a hopper directly connected to the screw extruder is maintained at a vacuum to prevent air from entering the inside of the screw extruder and at the same time to discharge gases produced in the screw extruder.

To this end, an apparatus as shown in FIG. 1 has been conventionally used. That is, two hoppers B and C are provided above a screw extruder E, and synthetic resin powder is fed to the hoppers from a raw material tank A using a vacuum pump D. The feeding of the synthetic resin is performed such that the upper stage hopper B is first made vacuous so as to vacuum-attract the raw synthetic resin powder, which is then transferred to the lower hopper C, and then again evacuated while the raw synthetic resin powder is continuously fed into the screw extruder from the lower hopper C. To accomplish this end, it is necessary to alternatingly open/close numbers of valves.

In such a machine, the operation is complex and a complex controller is therefore required. Further, it takes a long time (usually, about eight hours by two persons) to reassemble the vacuum hopper after overhaul cleaning of the hopper has been performed for the purpose of preventing foreign raw materials from being mixed when the type of raw synthetic resin is changed. This is because accuracy is required in assembling the hopper since it is necessary to maintain the inside of the hopper at a high degree of vacuum when the vacuum line is closed in the operation of the screw extruder.

SUMMARY OF THE INVENTION

The inventors of this application have conducted research with respect to the simplification of the apparatus and solutions for the above-mentioned problems in the prior art, and attained the present invention, as described hereafter with respect to the accompanying drawing.

DETAILED DESCRIPTION OF THE PREFERRED EMBODIMENTS

Figure 1:
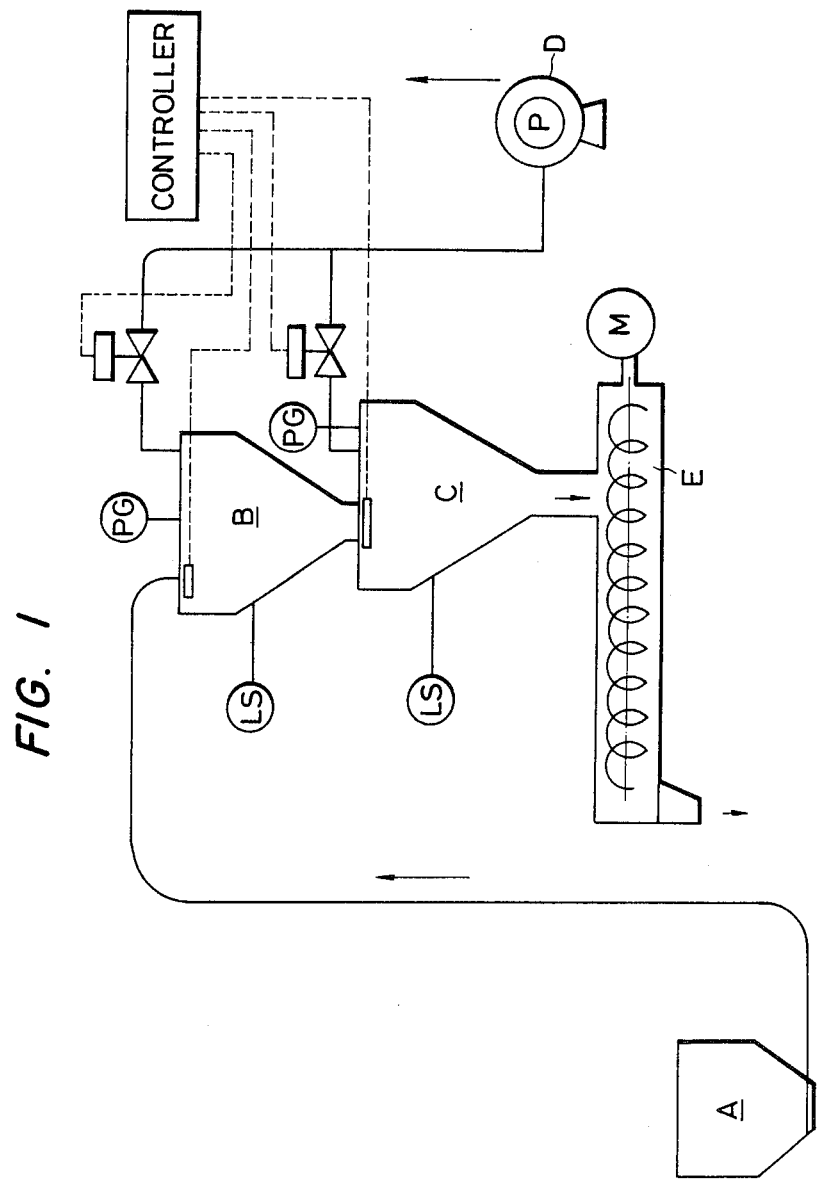
FIG. 1 is a schematic diagram illustrating a conventional apparatus for vacuum-feeding a raw material powder to a screw extruder.
Figure 2:
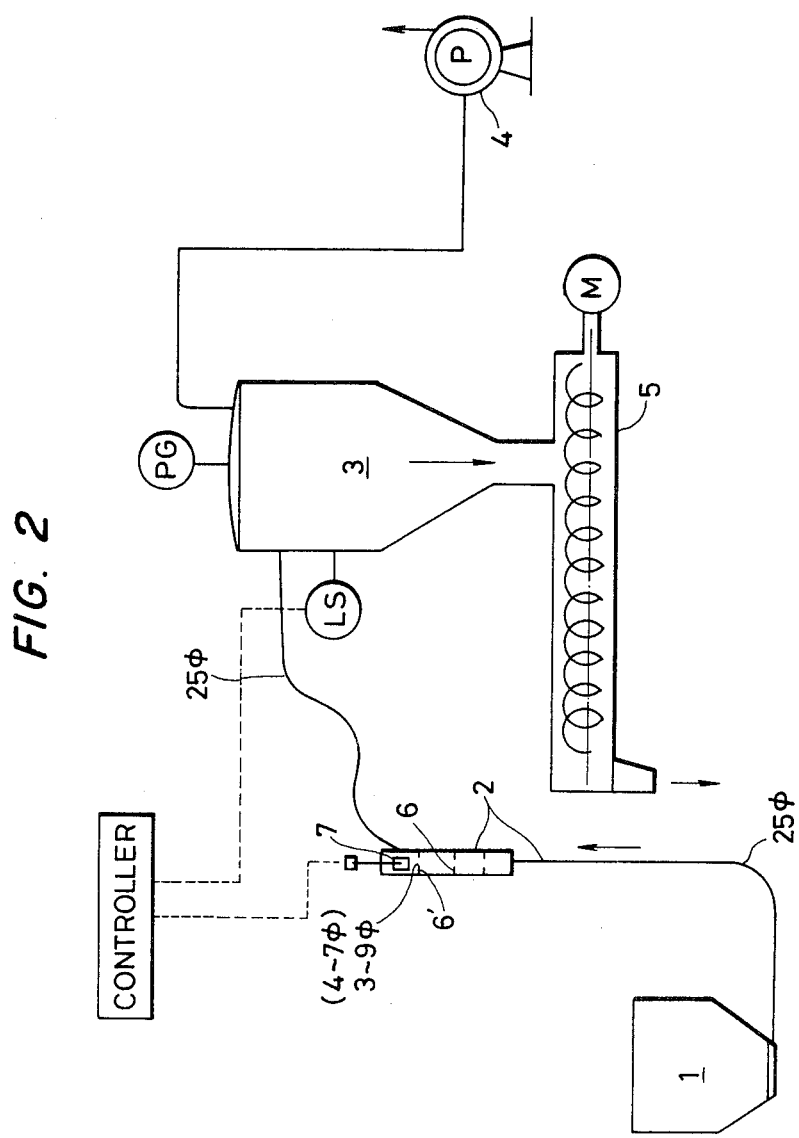
FIG. 2 is a schematic diagram illustrating the apparatus according to an embodiment of the present invention.

According to an embodiment of the present invention, in an apparatus for feeding synthetic resin powder to a screw extruder 5, a raw material feed-line connecting a synthetic resin powder tank 1 to a vacuum hopper 3 directly connected to the screw extruder has a vertical or substantially vertical pipe-line portion 2 as one part. At least one means 6 (for example an orifice or nozzle) is provided in the vertical pipe portion and has the function of providing fluid resistance by reducing the inner diameter of the pipe-line portion to 3–9 mm. A means 7 is provided at a portion of the pipe-line upwardly of the means 6 for blocking the pipe-line, and the vacuum hopper is connected to a vacuum pump 4.

According to the present invention, the transfer of the raw synthetic resin powder from the raw material tank 1 to the vacuum hopper 3 is performed by the vacuum pump 4. The raw synthetic resin powder is transported in the form of a fixed layer (fill later) until it reaches the means 6 which provides fluid resistance by reducing the pipe-line diameter (hereinafter the means 6 is represented by the term orifice). After it has passed the orifice, the material is led to the vacuum hopper 3 in a manner as if it swims in the pipe-line.

The orifice 6 is provided in a vertical or substantially vertical pipe-line portion 2 of the raw material feedline. The length of the vertical pipe-line portion is selected to be at least 1 cm, and preferably 10 cm upwardly and downwardly from the orifice 6. The inner diameter of the orifice is selected to be 3–9 mm, and preferably, 4–7 mm. The inner diameter of the orifice is not particularly related to the inner diameter of the pipe-line to which the orifice is attached, and particularly in the range of 1–10 cm inner diameters of the pipe-line, the effect due to the magnitude of the inner diameter of the pipe-line may be disregarded. The number of orifices is not restricted to one, but may be two or more. The smaller the inner diameter of the orifice and the larger the number of orifices, the smaller the quantity of transportation, while the higher the degree of vacuum which can be maintained inside of the vacuum hopper.

Any means will do for blocking the pipe-line at its portion upwardly of the orifice. For example, a ring 6' for slightly reducing the inner diameter of the pipe may be attached thereto at the portion upwardly of the orifice 6, and a cover plate 7 provided to block the hole of the ring 6' when downwardly moved. Alternatively, without providing the ring 6', the upwardly/downwardly movable cover plate 7 may be arranged to block the hole of the orifice 6 per se. Alternatively, in a case where the pipe-line is flexible, the pipe per se may be externally reduced.

In the operation of the apparatus according to the present invention, the vacuum pump 4 is continuously actuated to operate during the operation of the screw extruder 5, so that when the amount of raw synthetic resin powder supplied to the vacuum hopper 3 is balanced with the amount of the same used in the screw extruder the supply of raw synthetic resin powder from the tank 1 to the vacuum hopper 3 is continuously performed.

Usually, however, the amount supplied to the vacuum hopper is selected to be a little larger than the balance amount, and the amount of synthetic resin in the vacuum hopper is detected by a level meter. When the amount becomes excessive, the pipe-line blocking means 7 is actuated to block the raw material feed-line.

It is sufficient for the blocking means to block the pipe-line such that the supply of synthetic resin is substantially stopped, and high airtightness is not required. In the apparatus according to the present invention, there is no valve which requires a frequent opening/closing operation and high airtightness for maintaining a vacuum during the closed period as required in the conventional apparatus. This means that hopper reassembly may be easily performed within a short time after the overhaul cleaning thereof has been effected when the kind of raw synthetic resin is changed.

Synthetic resin powders which may be applied to the apparatus are required to have a particle size of 20–400 mesh (Tyler standard sieve) and an apparent specific gravity of 0.2–0.9. Usable synthetic resins are, for example, vinyl chloride resin, copolymerized vinylidene chloride resin, methyl methacrylic acid ester resin, and other copolymers.

In the operation of the apparatus according to the present invention, the degree of vacuum in the vacuum hopper can always be maintained to the extent of $-730$ mmHg by properly selecting the specifications of the vacuum pump. The pressure deviation is about 2 mmHg when the raw material feeding pipe-line is blocked by the pipe-line blocking means.

EXAMPLE

A vacuum hopper having an inner volume of 150 l was attached above a screw extruder which was connected to a raw material tank through a pipe-line having an inner diameter of 25 mm, with one end of the vacuum hopper being communicated with a vacuum pump. Using the thus arranged apparatus, an experiment was effected with respect to the relation between the raw material supply amount and the degree of vacuum in the vacuum hopper when the number of and inner diameter of orifices attached to the vertical portion of the pipe-line were changed. The results of this experiment are as shown in the following table.

TABLE 1

| ORIFICE | | DEGREE OF | SUPPLY |
|---|---|---|---|
| INNER DIAMETER (mm) | NUMBER | VACUUM (Torr) | AMOUNT (Kg/min) |
| 5 | 2 | 100 | 2.0 |
|   |   | 40 | 2.5 |
|   | 3 | 120 | 1.4 |
|   |   | 40 | 1.8 |
| 7 | 2 | 120 | 3.8 |
|   |   | 40 | 4.6 |
|   | 3 | 120 | 3.0 |
|   |   | 40 | 3.5 |

In the experiment, as the raw synthetic resin powder, vinyl chloride having an average particle size of 150μ and an apparent specific gravity of 0.6 was used.

Moldings were produced by continuous running for ten days for each of the operation conditions shown in the Table 1 above, and the quality of the products was superior and stable.

After the run ended, the vacuum hopper was overhaul-cleaned and reassembled. The time required for this work was only one hour by one person.

What is claimed is:

1. An apparatus for feeding synthetic resin powder to a screw extruder, comprising; a raw material feed-line connecting a synthetic resin powder tank and a vacuum hopper connected directly to said screw extruder, said feed-line having an at least substantially vertical pipe-line portion at at least one portion in-line with said feed-line, at least one flow restriction means being provided in said vertical pipe-line portion, means for blocking said raw material feed-line and disposed in said pipe-line portion at a portion thereof upwardly of said flow restriction means, said vacuum hopper being connected to a vacuum pump.

2. An apparatus as claimed in claim 1, wherein said flow restriction means comprises at least one nozzle disposed in said vertical pipe-line portion.

3. An apparatus as claimed in claim 1, wherein said flow restriction means comprises at least one orifice disposed in said vertical pipe-line portion.

4. An apparatus as claimed in claim 1, wherein said flow restriction means comprises a flow passageway having a diameter in the range of 3–9 mm.

5. An apparatus as claimed in claim 1, wherein said blocking means comprises an opening upwardly of said flow restriction means and movable means for at least substantially closing off said opening.

6. An apparatus as claimed in claim 1, wherein said blocking means comprises movable means for at least substantially closing off said flow restriction means.

* * * * *